(12) United States Patent
Studnitzer et al.

(10) Patent No.: US 7,899,749 B1
(45) Date of Patent: Mar. 1, 2011

(54) SYSTEM AND METHOD FOR PROVIDING INTELLIGENT MARKET DATA SNAPSHOTS

(75) Inventors: Ari Studnitzer, Chicago, IL (US);
Seshadri Sundaram, Aurora, IL (US);
Kevin Kometer, Palatine, IL (US); Sana Fathallah-Shaykh, Chicago, IL (US);
James R. Krause, Palatine, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 658 days.

(21) Appl. No.: 11/292,971

(22) Filed: Dec. 2, 2005

Related U.S. Application Data

(60) Provisional application No. 60/706,684, filed on Aug. 9, 2005.

(51) Int. Cl.
*G06Q 40/00* (2006.01)
(52) U.S. Cl. ........................................ 705/40
(58) Field of Classification Search .................. 705/37, 705/39, 40
See application file for complete search history.

(56) References Cited

U.S. PATENT DOCUMENTS 4,412,287 A * 10/1983 Braddock, III ............... 705/37
7,318,048 B1 * 1/2008 King ............................ 705/39
7,359,877 B2 * 4/2008 Malitzis et al. ............... 705/37
7,366,691 B1 * 4/2008 Kemp et al. .................. 705/35
7,433,855 B2 * 10/2008 Gavan et al. .................. 706/47
7,539,638 B1 * 5/2009 Keith .......................... 705/37
7,693,748 B1 * 4/2010 Mesaros ....................... 705/26
2002/0116314 A1 * 8/2002 Spencer et al. ............... 705/37
2003/0236737 A1 * 12/2003 Kemp et al. .................. 705/37
2004/0073506 A1 * 4/2004 Tull et al. ..................... 705/36
2004/0210511 A1 * 10/2004 Waelbroeck et al. .......... 705/37
2006/0178918 A1 * 8/2006 Mikurak ........................ 705/7
2009/0037320 A1 * 2/2009 Tully et al. .................... 705/37

OTHER PUBLICATIONS

R.R. Donnelley & Sons Co. Annual/10K Report—2001 ProQuest Annual Reports. 2001. p. 1.*
Monster Employment Index Surges in November to Highest Level Ever, Showing Sharp Increase in U.S. Online Job Demand Business Wire. New York: Dec. 1, 2005. p. 1.*

* cited by examiner

*Primary Examiner*—Olabode Akintola
*Assistant Examiner*—Luis Santiago
(74) *Attorney, Agent, or Firm*—Banner & Witcoff Ltd.

(57) ABSTRACT

Systems and methods are provided for processing and distributing market data. Critical data, such as data showing that a market price has changed is distributed without further delay. When the market data does not result in a change in a market price or does not meet another critical criteria, the market data is aggregated with market data for similar events and distributed when the aggregated market data passes a quantity threshold.

20 Claims, 6 Drawing Sheets

SYSTEM AND METHOD FOR PROVIDING INTELLIGENT MARKET DATA SNAPSHOTS

The present application claims the benefit of U.S. provisional patent application No. 60/706,684, filed Aug. 9, 2005 and entitled "System and Method for Providing Intelligent Market Data Snapshots," the entire disclosure of which is hereby incorporated by reference.

FIELD OF THE INVENTION

The present invention relates to systems and methods for distributing market data. More particularly, the invention provides systems and methods for minimizing the amount of market data that is distributed by an exchange or other financial instrument trade matching entity.

DESCRIPTION OF THE RELATED ART

Modern exchanges must process and distribute large quantities of market data. Market data is typically generated for every new order and cancellation of a pending order. Market data is also typically generated when orders are matched. The distribution of large quantities of market data consumes processing resources and bandwidth.

Attempts have been made to limit the amount of market data distributed by exchanges. Some systems distribute market data periodically. All market data is compiled and sent at designated transmission times, such as every second. For example, if there are initially ten resting orders at a given price and fifteen additional orders are received before the next transmission time, at the next transmission time a single market data message is transmitted to show that there are twenty five resting orders at the given price.

One of the drawbacks associated with systems that utilize periodic market data messages is that such systems may not reflect current market prices. If the market changes between market data transmissions, traders are not presented with current information. Without current and accurate price information, traders cannot make optimal trading decisions.

Therefore, there exists a need in the art for systems and methods that reduce the amount of market data that is distributed by an exchange while still alerting traders of relevant events.

SUMMARY OF THE INVENTION

The present invention overcomes at least some of the problems and limitations of the prior art by providing systems and methods that use a tier structure for distributing market data. In one embodiment, market data corresponding to a market event is received at a market data module. The market data module may be located at an exchange or other entity that distributes market data. The market data is first analyzed to determine if the market data results in a change in a market price. When the market data results in a change in a market price, the market data is distributed without delay. When the market data does not result in a change in a market price, the market data is aggregated with market data for similar events and distributed when the aggregated market data passes a quantity threshold. As used herein "aggregated" means that new data is combined with existing data. For example, new data representing an order for ten contracts may be aggregated with existing data representing orders for five contracts to produce aggregated data that represents orders for fifteen contracts. In various embodiments market data passes a quantity threshold when the data exceeds the quantity threshold or falls below the quantity threshold.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Exemplary Operating Environment

Figure 1:
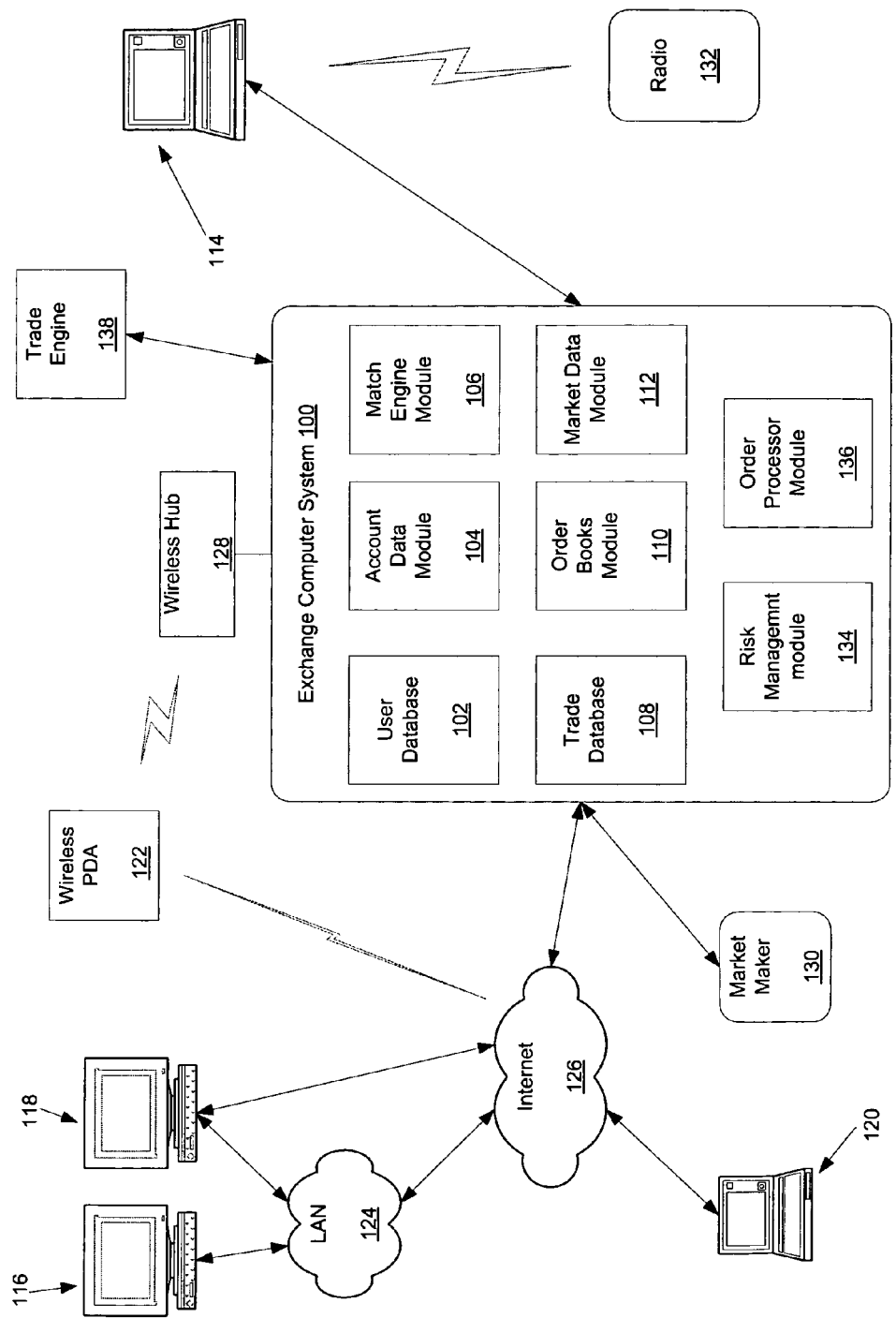
FIG. 1 illustrates a computer network system that may be used to implement aspects of the present invention.

Aspects of the present invention are preferably implemented with computer devices and computer networks that allow users to exchange trading information, such as market data. An exemplary trading network environment for implementing trading systems and methods is shown in FIG. 1.

An exchange computer system 100 receives orders and transmits market data related to orders and trades to users. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices.

A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
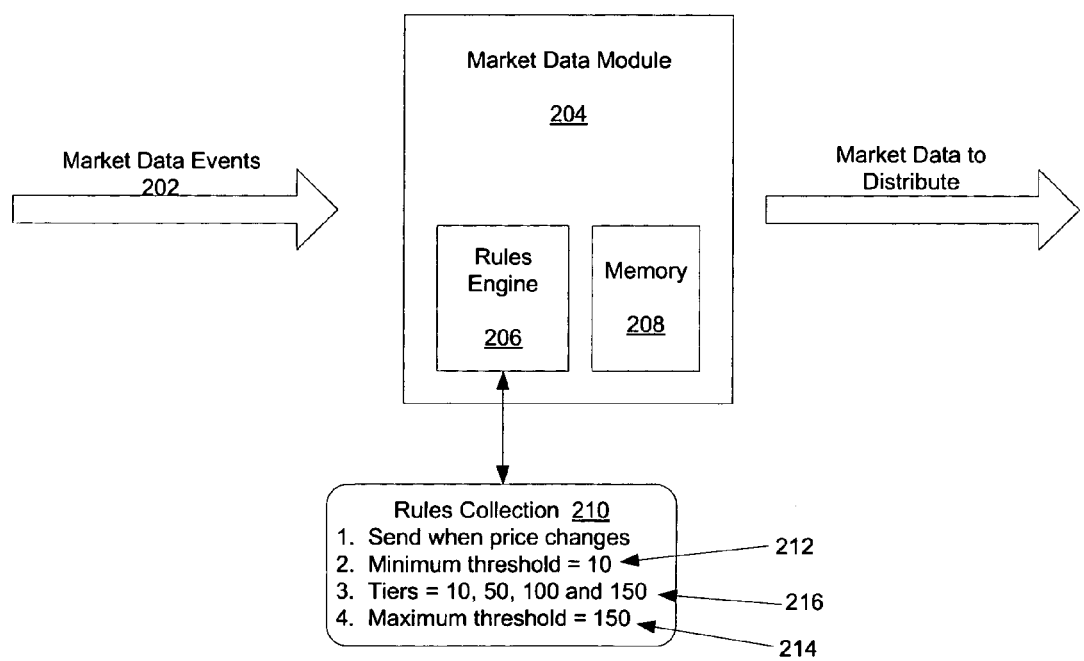
FIG. 2 illustrates a system for distributing market data in accordance with an embodiment of the invention.

FIG. 2 shows a system for distributing market data in accordance with an embodiment of the invention. Market data events 202 are received at a market data module 204. Market data events may include or correspond to new orders, cancellation of orders, matching of orders or any other event that typically results in an exchange or other entity distributing market data. In one embodiment of the invention market data module 204 performs functions similar to that of market data module 112 (shown in FIG. 1). Market data module 204 may include a rules engine 206 and a memory 208. Rules engine 206 may be implemented with a conventional rules engine and may be linked to a rules collection 210.

In alternative embodiment of the invention rules engine 206 is linked to multiple rules collections. Each rules collection may correspond to a class of service purchased by subscribers of market data. For example, a first rules collection may utilize four tiers, a second rules collection may utilize ten tiers and a third rules collection may utilize twenty tiers. An exchange or other entity distributing market data may allow subscribers to decide which level of service they desire. A higher number of tiers corresponds to a higher service level and may be priced accordingly.

Figure 3:
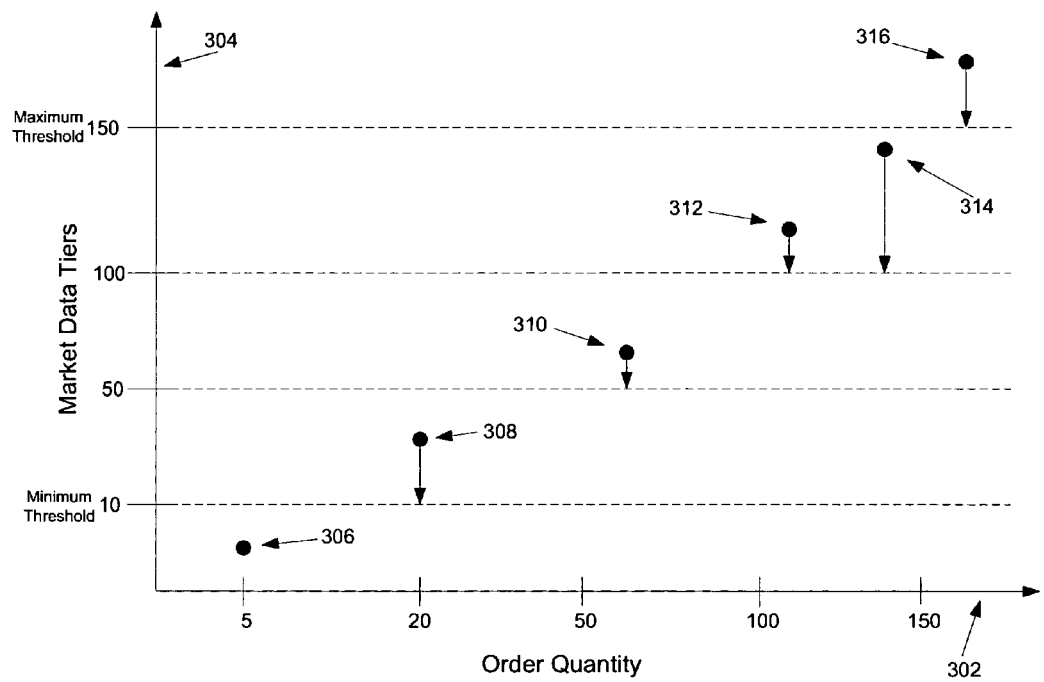
FIG. 3 illustrates a market data tier structure, in accordance with an embodiment of the invention.

Returning to FIG. 2, rules collection 210 may be used to implement a market data tier structure. FIG. 3 shows a market data tier structure corresponding to rules collection 210. A horizontal axis 302 represents the pending order quantity. For example, a value of five means that there are orders for five financial instruments. The financial instruments may be options contracts, futures contracts, equity contracts, interest rate related contracts or any other financial instrument traded at an exchange. A vertical axis 302 identifies tier values of 10, 50, 100 and 150. Rule 212 sets a minimum threshold value at ten. This means that a pending order quantity that is less than ten is represented by the actual number of pending orders. For example, data point 306 corresponds to a pending order quantity of five and is represented by the actual pending order quantity. In contrast, data point 308 corresponds to a pending order quantity of twenty and is represented as being greater than or equal to ten. Ten is the first tier level below the actual pending order quantity. Data points 310, 312, 314 and 316 are also represented by the first tier level below the actual pending order quantity. Rule 214 sets a maximum threshold level at one hundred fifty. Any pending order quantity greater than one hundred fifty is represented as being greater than or equal to one hundred fifty.

Various embodiments of the invention may also use a dynamic tier structure. For example, the granularity of the tiers may be a function of market data bandwidth consumption or trading activity. Tiers may also vary along a distribution path or within a single entity, such as an exchange.

One skilled in the art will appreciate that the system shown in FIG. 2 is only an exemplary embodiment for implementing aspects of the invention. In one alternative embodiment, a microprocessor may be programmed with computer-executable instructions to perform the functions described above. In another alternative embodiment of the invention, an application specific integrated circuit (ASIC) may be utilized. In other embodiments some or all of the functions performed by market data module 204 may be performed by one or more of the modules shown in exchange computer system 100 (shown in FIG. 1).

Figure 4:
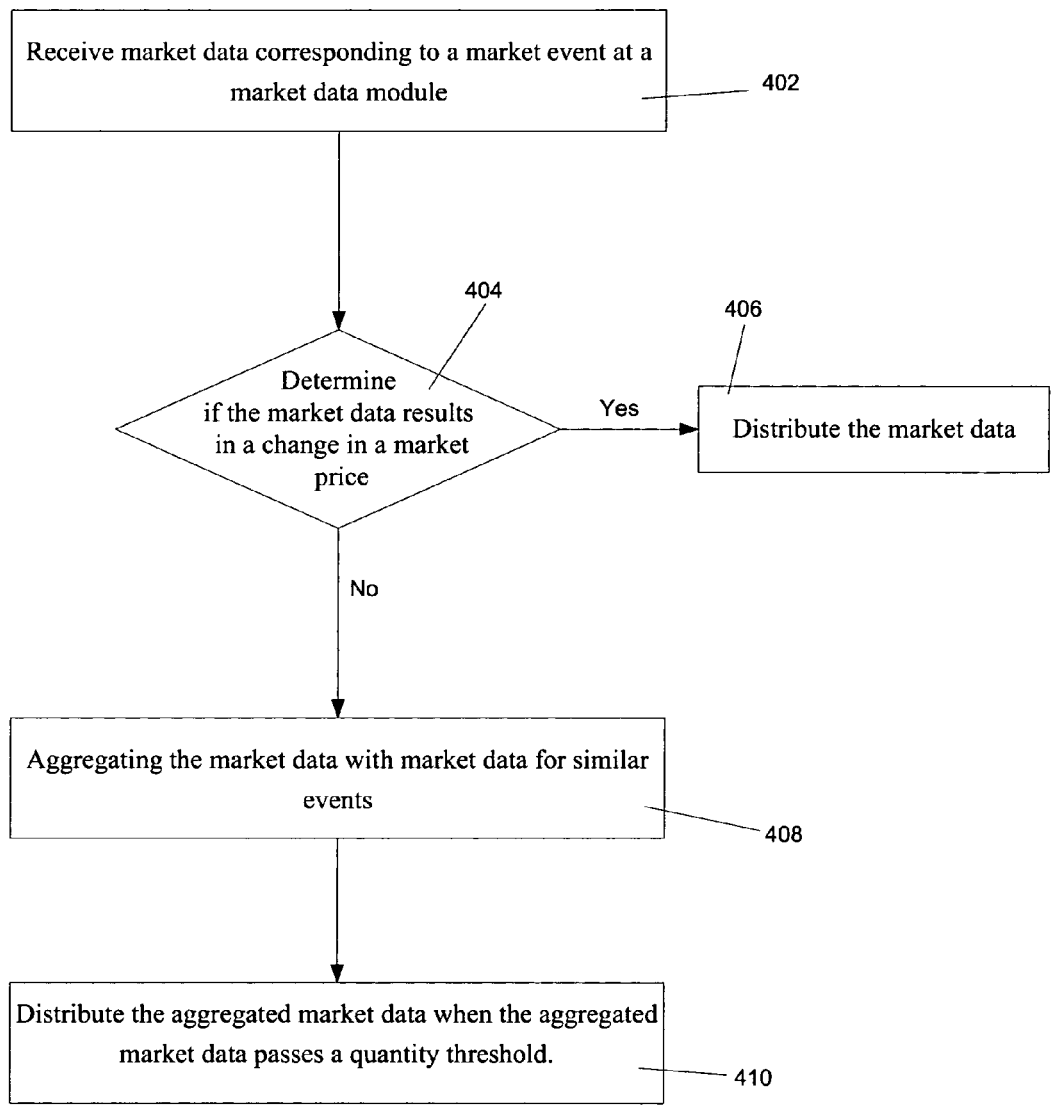
FIG. 4 illustrates a method that may be used to implement a market data tier structure, in accordance with an embodiment of the invention.

FIG. 4 shows a method that may be used to implement a market data tier structure, in accordance with an embodiment of the invention. In step 402 market data corresponding to a market event is received at a market data module. The market data module may be any hardware, software or combination of hardware and software that is configured to process and distribute market data. Next, in step 404 it is determined if the market data results in a change in a market price. When the market data does result in a change in a market price, the market data is distributed in step 406. The combination of steps 404 and 406 ensures that critical price change information that is important to traders is distributed, regardless of the presence of a tier structure that may be used to conserve processing resources and bandwidth.

When the market data does not result in a change in a market price, in step 408 the market data is aggregated with market data for similar events. For example, if the market data indicates that there is an order for five contracts at a given price, the quantity of five is aggregated with the pending order quantity that exist for the same contract at the same price. The aggregated data may be stored in a memory, such as memory 208 (shown in FIG. 2). Finally, when the aggregated market data passes a quantity threshold, the aggregated market data is distributed. The quantity threshold may be a tier level.

Figure 5:
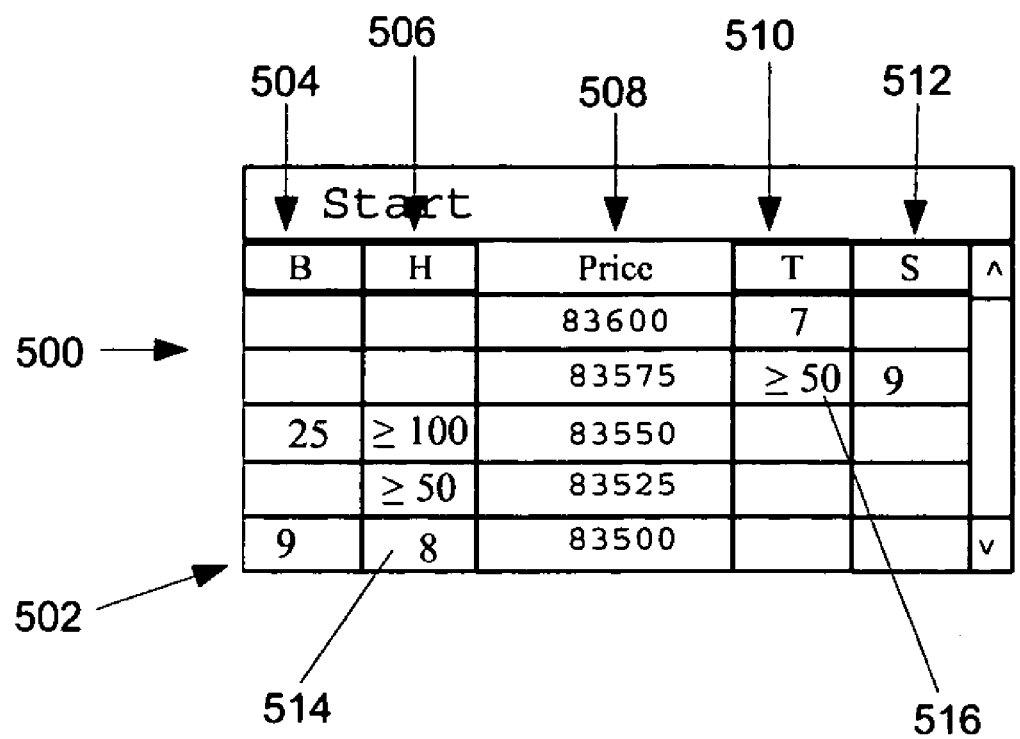
FIG. 5 illustrates an exemplary graphical user interface that may be used to display market depth information and allow traders to trade financial instruments, in accordance with an embodiment of the invention.

FIG. 5 illustrates an exemplary graphical user interface 500 that may be used to display market depth information and allow traders to trade financial instruments, in accordance with an embodiment of the invention. Graphical user interface 500 includes a price and quantity grid 502. Price and quantity grid 502 may contain five columns. A buy column 504 displays a user's working buy order quantities. As used herein, a user may be a trader. A hit column 506 displays the market bid quantities. Prices for individual rows are displayed in a price column 508. A take column 510 displays market ask quantities. And, a sell column 512 displays a user's working sell order quantities. Individual entries may be color coded to assist users in quickly interpreting the displayed information. For example, entries in buy column 504 and hit column 506 may be in blue and entries in take column 510 and sell column 512 may be in red.

The quantities included in columns 506 and 510 are in accordance with the rules defined in rules collection 210 (shown in FIG. 2). For example, cell 514 has a value of eight, which is less than the minimum threshold value of ten. The quantity is therefore represented by the actual number of eight. Cell 516 has a value of ≧50. Based on the tier values established by rule 216 (shown in FIG. 2), a user knows that the actual pending order quantity is at least fifty, but less than one hundred contracts. An exchange or other entity distributing market data will not distribute an updated market message until the pending order quantity results in a change in tier levels. For example, if the actual pending order quantity is seventy five, which is represented as ≧50, and an order for thirty more contracts is received at the exchange, which raises the actual pending order quantity to one hundred five, market data will be distributed to indicate that the pending order quantity is ≧100 that price level.

In one embodiment of the invention graphical user interface 500 may be used even when market data is not distributed in accordance with a tier structure. A computer device providing data to graphical user interface 500 may include a rules engine and rules collection or other mechanisms for implementing a tier structure. A user may select tier values that are appropriate for the user to limit changes made to the graphical user interface. One advantage associated with limiting changes to the state of graphical user interface 500 is that it reduces the risk of a trader entering an unintended order because of a change in the state of the interface.

A exchange computer system and/or a trader computer system may utilize a data structure for associated pending order quantities with price levels. In one embodiment, the data structure includes a plurality of price fields that represent pending order prices. A plurality of quantity fields may each represent a pending order quantity that exist at a price included in the plurality of price fields. The quantity of pending orders may be expressed in tiers according to a predetermined tier structure, as described above.

Figure 6:
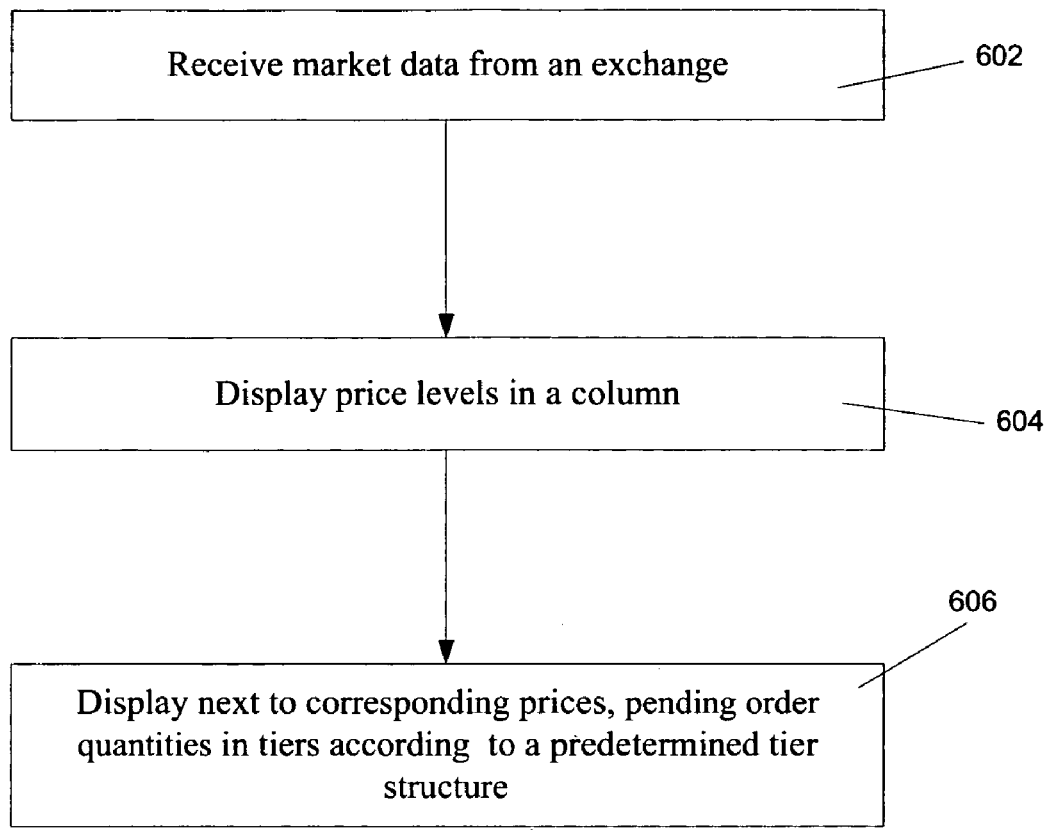
FIG. 6 illustrates a method of processing market data in accordance with an embodiment of the invention.

FIG. 6 illustrates a method of processing market data in accordance with an embodiment of the invention. First, in step 602 market data is received from an exchange or other entity that distributes market data. Next, price levels are displayed in a column in step 604. The price column may be similar to price column 508 (shown in FIG. 5). In step 606 pending order quantities are displayed next to corresponding prices included in the price column and in accordance with a tier structure. In one embodiment the market data received in step 602 is in accordance with the tier structure.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. For example, an exchange or other entity may distribute a separate market data stream for each financial instrument that is traded. Each market data stream may use a tier structure adapted for use with the particular financial instrument. Market data streams for implied and actual order books may also be combined.

We claim:

1. A method of distributing market data from an exchange computer system, the method comprising:
    (a) processing, by a processor of the exchange computer system, market data corresponding to a market event;
    (b) applying a rules collection by a rules engine to determine whether to initiate immediate distribution of the market data and whether to aggregate the market data prior to distribution;
    (c) when the received market data results in a change in a market price of a financial instrument, applying the rules collection by the rules engine to initiate immediate distribution of the received market data; and
    (d) when the received market data does not result in the market price changing, applying the rules collection by the rules engine to cause aggregation of the received market data with aggregated market data for the financial instrument, including aggregating a quantity value of the received market data with a quantity value of the aggregated market data and distributing the aggregated market data when the aggregated market data passes a quantity threshold.

2. The method of claim 1, wherein the quantity threshold consists of a pending order quantity.

3. The method of claim 1, wherein (c) includes:
when the received market data results in a change in inside market prices, aggregating the market data with market data for the financial instrument and distributing the aggregated market data.

4. The method of claim 1, wherein the market event in (a) consists of a new order.

5. The method of claim 1, wherein the market event in (a) consists of the cancellation of an order.

6. The method of claim 1, wherein the market event in (a) consists of a new order and the cancellation of an existing order.

7. The method of claim 1, wherein the market event in (a) consists of the matching of at least two orders.

8. A computing apparatus configured to distribute market data, the computing apparatus comprising:
a memory that stores aggregated market data of a financial instrument; and
a market data module comprising a rules engine and being configured to:
receive market data of the financial instrument,
apply a rules collection by the rules engine to determine whether to initiate immediate distribution of the received market data and whether to aggregate the received market data prior to distribution,
in response to determining that the received market data results in a change in a market price of the financial instrument, the market data module is further configured to cause the rules engine to apply the rules collection to initiate immediate distribution of the received market data, and
in response to determining that the received market data does not result in the market price changing, the market data module is further configured to:
aggregate the received market data with the aggregated market data for the financial instrument stored in the memory, including aggregating a quantity value of the received market data with a quantity value of the aggregated market data, in accordance with a predetermined tier structure, and
distribute the aggregated market data when the aggregated market data passes a quantity threshold defined by the predetermined tier structure, where the aggregated market data comprises the quantity value of the aggregated market data stored in the memory.

9. The computing apparatus of claim 8, wherein the market data module comprises a processor programmed to implement the predetermined tier structure.

10. The computing apparatus of claim 8, wherein the quantity threshold consists of a pending order quantity.

11. The computing apparatus of claim 8, wherein when the received market data results in a change in inside market prices, aggregating the market data with market data for the financial instrument and distributing the aggregated market data.

12. The computing apparatus of claim 8, wherein the market data corresponds to a market event that consists of a new order.

13. The computing apparatus of claim 8, wherein the market data corresponds to a market event that consists of the cancellation of an order.

14. The computing apparatus of claim 8, wherein the market data corresponds to a market event that consists of a new order and the cancellation of an existing order.

15. The computing apparatus of claim 8, wherein the market data corresponds to a market event that consists of the matching of at least two orders.

16. A computer readable medium storing computer executable instructions that, when executed, cause an apparatus at least to perform:
(a) receiving market data corresponding to a market event;
(b) applying a rules collection by a rules engine to determine whether to initiate immediate distribution of the market data and whether to aggregate the market data prior to distribution;
(c) when the received market data results in a change in a market price of a financial instrument, initiating immediate distribution of the received market data; and
(d) when the received market data does not result in the market price changing, aggregating the received market data with aggregated market data for the financial instrument, including aggregating a quantity value of the received market data with a quantity value of the aggregated market data and distributing the aggregated market data when the aggregated market data passes a quantity threshold.

17. The computer readable medium of claim 16, wherein the quantity threshold consists of a pending order quantity.

18. The computer readable medium of claim 16, wherein the computer executable instructions, when executed, cause the apparatus at least to aggregate the market data with market data for the financial instrument and distribute the aggregated market data when the received market data results in a change in inside market prices.

19. The computer readable medium of claim 16, wherein the market event in (a) consists of a new order and/or of the cancellation of an order.

20. The computer readable medium of claim 16, wherein the market event in (a) consists of the matching of at least two orders.

* * * * *